US010396317B2

(12) United States Patent
Lee et al.

(10) Patent No.: US 10,396,317 B2
(45) Date of Patent: Aug. 27, 2019

(54) ULTRASONIC WELDING APPARATUS AND SECONDARY BATTERY WITH ENHANCED ELECTRODE STRUCTURE

(71) Applicant: LG Chem, Ltd., Seoul (KR)

(72) Inventors: Kyung-Min Lee, Daejeon (KR); Young-Joon Shin, Daejeon (KR); Hyun-Woo Park, Daejeon (KR); Jae-Pil Lee, Daejeon (KR); Jin-Young Park, Daejeon (KR); Jun-Kyu Park, Jeollabuk-do (KR)

(73) Assignee: LG Chem, Ltd. (KR)

(*) Notice: Subject to any disclaimer, the term of this patent is extended or adjusted under 35 U.S.C. 154(b) by 470 days.

(21) Appl. No.: 14/092,398

(22) Filed: Nov. 27, 2013

(65) Prior Publication Data
US 2014/0087245 A1 Mar. 27, 2014

Related U.S. Application Data

(63) Continuation of application No. PCT/KR2012/004271, filed on May 30, 2012.

(30) Foreign Application Priority Data

May 30, 2011 (KR) .......... 10-2011-0051482
May 30, 2011 (KR) .......... 10-2011-0051493

(51) Int. Cl.
H01M 2/06 (2006.01)
H01M 2/22 (2006.01)
(Continued)

(52) U.S. Cl.
CPC .......... H01M 2/06 (2013.01); B23K 20/106 (2013.01); H01M 2/0212 (2013.01); H01M 2/20 (2013.01);
(Continued)

(58) Field of Classification Search
None
See application file for complete search history.

(56) References Cited

U.S. PATENT DOCUMENTS 2,379,187 A * 6/1945 Richards .............. 219/119
4,078,125 A * 3/1978 Brown ............ H01M 2/1653
429/145
(Continued)

FOREIGN PATENT DOCUMENTS

JP 2003-223880 8/2003
JP 2004221294 A * 8/2004 ........ H01L 24/40
(Continued)

OTHER PUBLICATIONS

Graff et al., Understanding Ultrasonic Welding, 2008 NPL; 5 pages total.*

(Continued)

Primary Examiner — Ula C Ruddock
Assistant Examiner — Anna Korovina
(74) Attorney, Agent, or Firm — Lerner, David, Littenberg, Krumholz & Mentlik, LLP

(57) ABSTRACT

The present disclosure describes an ultrasonic welding apparatus, which improves the welding strength of an electrode tab and an electrode lead included in a secondary battery, and a secondary battery with an enhanced electrode structure strength by using the ultrasonic welding apparatus. The secondary battery includes an electrode assembly in which a cathode plate provided with a cathode tab, an anode plate provided with an anode tab, and a separator are stacked in turn; a pouch for receiving the electrode assembly; a cathode lead electrically coupled to the cathode tab by welding; and an anode lead electrically coupled to the anode tab by welding, wherein the density of welding points, formed at a welding surface between the anode lead and the anode tab, (Continued)

(a)

(b)

is higher than that of welding points, formed at a welding surface between the cathode lead and the cathode tab.

6 Claims, 10 Drawing Sheets

(51) Int. Cl.
*H01M 2/26* (2006.01)
*H01M 2/20* (2006.01)
*H01M 2/02* (2006.01)
*H01M 2/30* (2006.01)
*H01M 10/04* (2006.01)
*B23K 20/10* (2006.01)
*B23K 101/38* (2006.01)

(52) U.S. Cl.
CPC ............... *H01M 2/22* (2013.01); *H01M 2/26* (2013.01); *H01M 2/30* (2013.01); *B23K 2101/38* (2018.08); *H01M 2/266* (2013.01); *H01M 10/04* (2013.01)

(56) References Cited

U.S. PATENT DOCUMENTS

| | | | |
|---|---|---|---|
| 6,335,110 B1 | 1/2002 | Chang et al. | |
| 6,517,671 B2* | 2/2003 | Couillard et al. | 156/580.2 |
| 6,641,027 B2 | 11/2003 | O'Connell et al. | |
| 6,824,630 B2* | 11/2004 | Oishi | B23K 20/106 |
| | | | 156/580.2 |
| 2003/0170535 A1* | 9/2003 | Watanabe | H01M 2/1077 |
| | | | 429/158 |
| 2006/0169388 A1* | 8/2006 | Shimizu et al. | 156/73.1 |
| 2007/0231683 A1* | 10/2007 | Lee | H01M 2/021 |
| | | | 429/161 |
| 2008/0110550 A1* | 5/2008 | Lehto | B29C 66/92611 |
| | | | 156/73.1 |
| 2009/0117456 A1* | 5/2009 | Hosaka | H01M 2/206 |
| | | | 429/152 |
| 2011/0070477 A1 | 3/2011 | Fujiwara et al. | |
| 2011/0076544 A1 | 3/2011 | Maeda et al. | |

FOREIGN PATENT DOCUMENTS

| | | |
|---|---|---|
| JP | 2005-267878 | 9/2005 |
| JP | 2011-65900 | 3/2011 |
| JP | 2011-76838 | 4/2011 |
| KR | 10-322098 | 1/2002 |
| KR | 10-2007-0047377 | 5/2007 |
| KR | 10-2008-0036250 | 4/2008 |
| KR | 10-2009-0088761 | 8/2009 |
| KR | 10-0987300 | 10/2010 |
| KR | 10-2010-0117746 A | 11/2010 |

OTHER PUBLICATIONS

Welding Technology Corporation 2010 NPL; 2 pages total.*
Chang et al. On Optimization of Some Parameters in Ultrasonic Metal Welding, 1974 NPL; 13 pages total.*
Shannon, Battery Welding Solution Using Laser and Resistance Technologies, 2009 NPL; 3 pages total.*
Nanba JP2004221294 Machine Translation (Year: 2004).*
International Search Report and Written Opinion for PCT/KR2012/004271 dated Dec. 6, 2012.

* cited by examiner (a)                (b)

(a)   (b)

(a)   (b)

(a)

(b)

(a)

(b)

(a)　　　　　　　　(b)

(a)

(b)

(a)   (b)

(a)   (b)

(a)　　　　　　　　　(b)

(a)

(b)

(a)　　　　　　　　　(b)

ULTRASONIC WELDING APPARATUS AND SECONDARY BATTERY WITH ENHANCED ELECTRODE STRUCTURE

CROSS-REFERENCE TO RELATED APPLICATION

The present application is a continuation of International Application No. PCT/KR2012/004271 filed on May 30, 2012, which claims priority to Korean Patent Application No. 10-2011-0051482 and No. 10-2011-0051493 filed in the Republic of Korea on May 30, 2011, the disclosures of which are incorporated herein by reference.

TECHNICAL FIELD

The present disclosure relates to an ultrasonic welding apparatus and a secondary battery with an enhanced electrode structure, and more particularly, to an ultrasonic welding apparatus, which improves the welding strength of an electrode tab and an electrode lead included in a secondary battery, and a secondary battery with an enhanced electrode structure by using the ultrasonic welding apparatus.

BACKGROUND ART

Unlike a primary battery incapable of recharging, a secondary battery is a rechargeable battery and widely used in electronic equipments, such as cellular phones, laptop computers, camcorders, or the like, and electric vehicles, etc. Particularly, since a lithium secondary battery has an operating voltage of around 3.6 V, a capacity approximately three times higher than that of Ni—Cd batteries or Ni—MH batteries used as a power source for electric equipments, and excellent energy density per unit weight, the use of a lithium secondary battery is rapidly increasing.

In such a lithium secondary battery, a lithium-based oxide and a carbon material are respectively used as a positive active material and a negative active material. A lithium secondary battery includes a cell assembly having a plurality of unit cells in which a cathode plate and an anode plate, respectively coated with the positive active material and the negative active material, are stacked with a separator being interposed therebetween and a case for receiving the cell assembly together with an electrolyte by sealing.

Depending on the type of the external case, lithium secondary batteries are classified into can type secondary batteries, in which a cell assembly is received in a metal can, and pouch type secondary batteries, in which a cell assembly is received in a pouch case made of an aluminum laminate sheet.

The pouch type secondary battery is manufactured at low costs, high energy density, and can easily make a large-capacity battery pack by connecting the pouch type secondary batteries in series or in parallel. Therefore, pouch type secondary batteries are widely used as power sources for electric vehicles or hybrid vehicles.

The pouch type secondary battery has a structure in which a cell assembly connected with a plate-shaped electrode lead is sealed with an electrolyte in a pouch case. The electrode lead is partially exposed to the outside of the pouch case and the exposed part of the electrode lead is electrically connected to an apparatus using a secondary battery or is used to electrically connect multiple secondary batteries to each other.

FIG. 1 is an exploded perspective view showing a conventional pouch type lithium secondary battery.

Referring to FIG. 1, a conventional pouch type lithium secondary battery 10 includes an electrode assembly 30, a plurality of electrode tabs 40, 50 extending from the electrode assembly 30, electrode leads 60, 70 coupled to the electrode tabs 40, 50 by welding and a pouch case 20 receiving the electrode assembly 30.

The electrode assembly 30 is a power generation device in which a cathode and an anode are stacked in turn with a separator interposed therebetween and constructed in a stack type structure, a jelly-roll type structure or a stacking/folding type structure. Korean Patent Laid-open Publication No. 10-2009-0088761 (Title: A secondary battery containing jelly-roll typed electrode assembly) and Korean Patent Laid-Open Publication No. 10-2007-0047377 (Title: A rectangular type secondary battery comprising jelly-roll electrode assembly) disclose a secondary battery 10 including an electrode assembly 30 in a jelly-roll type structure. Also, Korean Patent Application Laid-Open Publication No. 10-2008-0036250 (Title: A hybrid-typed stack and folding electrode assembly and secondary battery containing the same) and Korean Patent No. 10-0987300 (registered on Oct. 6, 2010. Title: A stack and folding-typed electrode assembly and method for preparation of the same) disclose an electrode assembly 30 in a stack/folding type structure or a secondary battery 10 including the electrode assembly 30.

The electrode tabs 40, 50 are respectively extended from each electrode plate of the electrode assembly 30, and the electrode leads 60, 70 respectively make electrical connection with the extended electrode tabs 40, 50 by welding, and the electrode assembly, in which the electrode leads are electrically connected to the electrode tabs as described above, is combined with the pouch case 20 to be partially exposed out of the pouch case.

The pouch case 20 is made of a flexible packing material, such as an aluminum laminate sheet, has space for receiving the electrode assembly 30, and has an overall pouch shape.

Meanwhile, when the electrode tabs 40, 50 are respectively welded to the electrode leads 60, 70, an ultrasonic welding method which facilitates the welding of a soft heat-affected zone (HAZ) and a thin metal foil is commonly used. By using the ultrasonic welding, ultrasonic vibrations in the range from 10 kHz to 75 kHz are generated to make an ultrasonic vibration frictional heat between metals, and the metals are welded through the ultrasonic vibration frictional heat. That is, while the electrode tabs 40, 50 come into contact with the electrode leads 60, 70, the ultrasonic vibrations are applied thereto by using an ultrasonic welding apparatus to generate a frictional heat from the contact surfaces between the electrode tabs 40, 50 and the electrode leads 60, 70, and thus, the electrode tabs 40, 50 and the electrode leads 60, 70 are respectively welded to each other through the generated heat.

Generally, the cathode structures 40, 60 and anode structures 50, 70 are made of materials having different properties. Aluminum is mainly used for the cathode structures 40, 60 and copper or nickel-coated copper is commonly used for the anode structures 50, 70. That is, the cathode tab 40 and the cathode lead 60 are made of aluminum materials, and the anode tab 50 and the anode lead 70 are made of copper or nickel-coated copper.

However, due to the dual electrode structure, the welding strength of a welding surface formed between the cathode tab 40 and the cathode lead 60 (hereinafter referred to as a 'cathode welding surface') is different from the welding strength of a welding surface formed between the anode tab 50 and the anode lead 70 (hereinafter referred to as an 'anode welding surface'). In other words, when the electrode tabs 40, 50 are respectively welded to the electrode leads 60, 70 through the same ultrasonic welding processes, since aluminum has a melting point lower than that of nickel or copper, it is easier to weld the cathode welding surface than the anode welding surface. Therefore, the welding strength of an anode welding surface becomes relatively lower than that of the cathode welding surface. Here, the welding strength indicates the maximum stress that a welding portion can endure.

When the welding strength of the anode welding surface is low, a contact condition between the anode tab 50 and the anode lead 70 in the secondary battery 10 may be easily damaged. That is, when the anode welding surface has a welding strength lower than the welding strength of the cathode welding surface, and in the case vibration or impact is applied to a secondary battery, the damage rate of the anode welding surface is higher than that of the cathode welding surface.

In addition, non-uniformity of the welding strength of the electrodes as described above leads to non-uniformity of contact resistance. In other words, as the welding strength of an anode welding surface is relatively low (i.e., bad contact condition), the contact resistance generated from the anode welding surface is higher than that generated from the cathode welding surface. The high contact resistance of a welding surface generates heat in a battery cell, and the electric conductivity of the secondary battery 10 deteriorates. Also, the non-uniform contact resistance of both electrodes causes irregular heating or side reaction which accelerates the degradation rate of the secondary battery 10.

To solve the foregoing problems, improvement is needed to enhance the welding strength for the welding surfaces between the anode tab 50 and the anode lead 70.

DISCLOSURE

Technical Problem

The present disclosure is designed in consideration of the problems of the prior art, and therefore it is an object of the present disclosure to provide an ultrasonic welding apparatus, which forms a cathode welding surface and an anode welding surface to have a uniform welding strength, and a secondary battery in which a cathode welding surface and an anode welding surface are formed to have a uniform welding strength.

It is another object of the present disclosure to provide an ultrasonic welding apparatus and a secondary battery, which enhances the welding strength of an anode welding surface, thereby protecting the coupling portion of an anode tab and an anode lead from external physical impacts.

It is still another object of the present disclosure to provide an ultrasonic welding apparatus and a secondary battery, which reinforces the welding strength of side portions of an electrode structure, thereby protecting cathode and anode welding surfaces from external physical impacts applied in a lateral direction.

It is still another object of the present disclosure to provide an ultrasonic welding apparatus and a secondary battery, which enhances the welding strength of an anode welding surface while maintaining an anode lead and a cathode lead to have the same welding area.

Further purposes and advantages of the present disclosure will become more apparent from the following description and from the accompanying embodiment of the present disclosure. Also, the purpose and advantage of the present disclosure may be achieved in accordance with a particular constitution illustrated in the scope of the present disclosure and the combination thereof.

Technical Solution

In order to accomplish the above object, according to an aspect of the present disclosure, there is provided a secondary battery, including an electrode assembly in which a cathode plate provided with a cathode tab, an anode plate provided with an anode tab, and a separator are stacked in turn; a pouch for receiving the electrode assembly; a cathode lead electrically coupled to the cathode tab by welding; and an anode lead electrically coupled to the anode tab by welding, wherein the density of welding points, formed at a welding surface between the anode lead and the anode tab, is higher than that of welding points, formed at a welding surface between the cathode lead and the cathode tab.

In order to accomplish the above object, according to another aspect of the present disclosure, there is provided a secondary battery, including an electrode assembly in which a cathode plate provided with a cathode tab, an anode plate provided with an anode tab, and a separator are stacked in turn; a pouch for receiving the electrode assembly; a cathode lead electrically coupled to the cathode tab by welding; and an anode lead electrically coupled to the anode tab by welding, wherein the radius of a welding point in a welding surface between the anode lead and the anode tab is longer than that of a welding point in a welding surface between the cathode lead and the cathode tab.

In order to accomplish the above object, according to still another aspect of the present disclosure, there is provided a secondary battery, including an electrode assembly in which a cathode plate provided with a cathode tab, an anode plate provided with an anode tab, and a separator are stacked in turn; a pouch for receiving the electrode assembly; and cathode and anode leads respectively welded to the cathode and anode tabs to electrically couple to the cathode and anode tabs, wherein the density of welding points, formed at each welding surface of the cathode lead and the anode lead, is higher at both sides of the welding surface than at the center thereof.

In order to accomplish the above object, according to still another aspect of the present disclosure, there is provided a secondary battery, including an electrode assembly in which a cathode plate provided with a cathode tab, an anode plate provided with an anode tab, and a separator are stacked in turn; a pouch for receiving the electrode assembly; a cathode lead electrically coupled to the cathode tab by welding; and an anode lead electrically coupled to the anode tab by welding, wherein the density of the welding points, formed at a welding surface between the anode lead and the anode tab, is higher than that of the welding points, formed at a welding surface between the cathode lead and the cathode tab, and the density of the welding points, respectively formed at welding surfaces of the cathode lead and anode lead, is higher at both sides of the welding surface than at the center thereof.

In order to accomplish the above object, according to still another aspect of the present disclosure, there is provided an ultrasonic welding apparatus for welding an electrode lead and an electrode tab of a secondary battery with ultrasonic waves, which includes a cathode horn for delivering ultrasonic waves while pressurizing a cathode lead and a cathode tab through a pressure surface, formed at the end of the cathode horn; and an anode horn for delivering ultrasonic waves while pressurizing an anode lead and an anode tab through a pressure surface, which is formed at the end of the anode horn and has a density higher than that of a pressure surface of the cathode horn.

In order to accomplish the above object, according to still another aspect of the present disclosure, there is provided an ultrasonic welding apparatus for welding an electrode lead and an electrode tab of a secondary battery with ultrasonic waves, which includes a cathode horn for delivering ultrasonic waves while pressurizing a cathode lead and a cathode tab through a pressure surface, formed at the end of the cathode horn; and an anode horn for delivering ultrasonic waves while pressurizing an anode lead and an anode tab through a pressure surface, which is formed at the end of the anode horn and has a density higher than that of a pressure surface of the cathode horn, wherein the anode horn pressurizes the anode lead with a pressure greater than a pressure used when the cathode horn pressurizes the cathode lead, or the anode horn transmits more intensive ultrasonic waves to the anode lead than the ultrasonic waves transmitted from the cathode horn to the cathode lead.

In order to accomplish the above object, according to still another aspect of the present disclosure, there is provided an ultrasonic welding apparatus for welding an electrode lead and an electrode tab of a secondary battery with ultrasonic waves, which includes a horn for delivering ultrasonic waves while pressurizing an electrode lead and an electrode tab through a pressure surface, formed at the end of the horn, wherein the density of the pressure surface, formed at the horn, is higher at both sides of the pressure surface than at the center thereof.

In order to accomplish the above object, according to still another aspect of the present disclosure, there is provided an ultrasonic welding apparatus for welding an electrode lead and an electrode tab of a secondary battery with ultrasonic waves, which includes a cathode horn for delivering ultrasonic waves while pressurizing a cathode lead and a cathode tab through a pressure surface, formed at the end of the cathode horn; and an anode horn for delivering ultrasonic waves while pressurizing an anode lead and an anode tab through a pressure surface, formed at the end thereof and having a density higher than that of a pressure surface density of the cathode horn, wherein the density of the pressure surface, respectively formed at the cathode horn and the anode horn is higher at both sides of the pressure surfaces than at the center thereof.

Advantageous Effects

In the present disclosure, since the density of welding points is high at an anode welding surface, the strength of the anode welding surface included in a secondary battery may be improved to the level of the strength of a cathode welding surface.

Also, in the present disclosure, since electrodes are formed to have uniform welding strength, degradation of a secondary battery caused by non-uniformity of the contact resistance of the electrodes may be overcome.

Further, in the present disclosure, since the side portions of an electrode welding portion have improved mechanical strength, a secondary battery may be protected from external physical impacts applied in a lateral direction.

Furthermore, in the present disclosure, since an anode lead and a cathode lead having the same welding areas are maintained, energy density deterioration of a secondary battery generated when the welding area of the anode lead expands, may be prevented.

DESCRIPTION OF DRAWINGS

The accompanying drawings illustrate preferred embodiments of the present disclosure and together with the following detailed description for better understanding of the technical spirit of the present disclosure. However, the present disclosure is not to be construed as being limited thereto. In the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
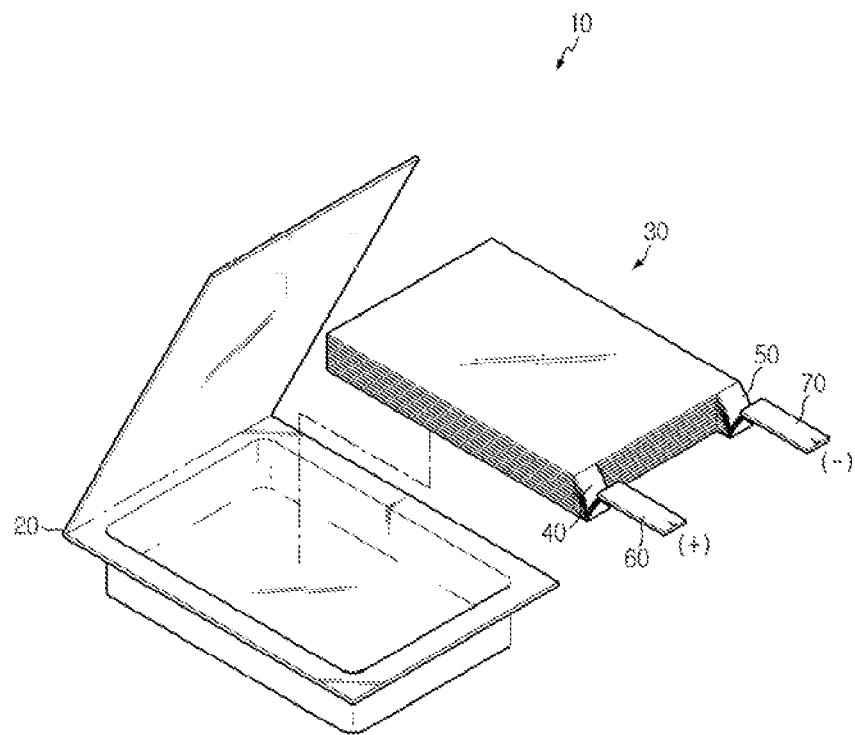
FIG. 1 is an exploded perspective view showing a conventional pouch type lithium secondary battery.
Figure 2:
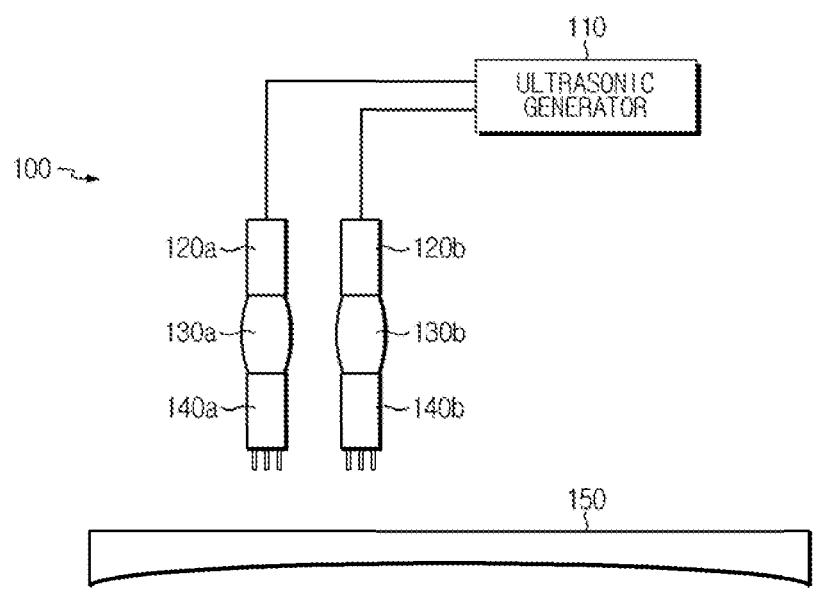
FIG. 2 is a view showing an ultrasonic welding apparatus according to an embodiment of the present disclosure.

FIG. 2 is a view showing an ultrasonic welding apparatus according to an embodiment of the present disclosure.

Figure 3:
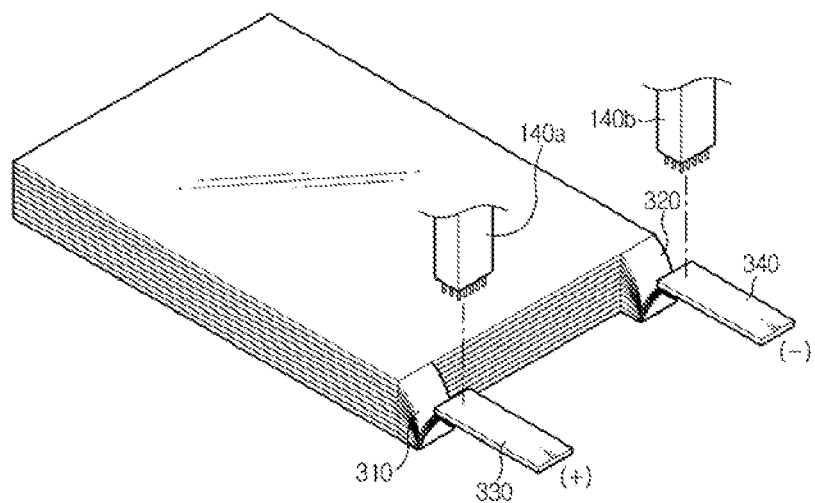
FIG. 3 is a view showing an electrode structure of a secondary battery, which is welded by using an ultrasonic welding apparatus according to an embodiment of the present disclosure.

FIG. 3 is a view showing an electrode structure of a secondary battery, which is welded by using an ultrasonic welding apparatus according to an embodiment of the present disclosure.

Referring to FIGS. 2 and 3, an ultrasonic welding apparatus 100 according to an embodiment of the present disclosure includes an ultrasonic generator 110, ultrasonic transducers 120a, 120b, boosters 130a, 130b, and horns 140a, 140b.

The ultrasonic generator 110 converts an AC current of 60 Hz into a high-frequency current of over 20 kHz and supplies the converted current to the ultrasonic transducers 120a, 120b.

The ultrasonic transducers 120a 120b, also called an ultrasonic motor, convert electrical energy to mechanical energy. That is, the ultrasonic transducers 120a, 120b convert a high-frequency current, received from the ultrasonic generator 110, into ultrasonic waves and provide the ultrasonic waves to the boosters 130a, 130b.

The boosters 130a, 130b amplify the ultrasonic waves received from the ultrasonic transducers 120a, 120b and deliver the amplified ultrasonic waves to the horns 140a, 140b.

The horns 140a, 140b pressurize surfaces of the electrode tabs 310, 320, placed on an anvil 130, with fixed loads and at the same time, apply the amplified ultrasonic waves delivered from the boosters 130a, 130b, to the electrode tabs 310, 320. Thus, a plurality of cathode tabs 310 and anode tabs 320 are primarily welded, respectively. Afterwards, the electrode leads 330, 340 come into contact with the electrode tabs 310, 320 to which primary welding is completed, the horns 140a, 140b pressurize surfaces of the electrode leads 330, 340 and apply the amplified ultrasonic waves, delivered from the boosters 130a, 130b, to the electrode leads 330, 340. Thus, the electrode leads 330, 340 and the electrode tabs 310, 320 are secondarily welded, respectively.

That is, the horns 140a, 140b pressurize the electrode leads 330, 340, which contact the electrode tabs 310, 320, with fixed loads and apply the amplified ultrasonic waves delivered from the boosters 130a, 130b to the electrode leads 330, 340. Accordingly, the contact surfaces between the electrode tabs 310, 320 and the electrode leads 330, 340 generate a frictional heat, and the electrode tabs 310, 320 are respectively welded to the electrode leads 330, 340 through the frictional heat.

The horns 140a, 140b may be classified as an anode horn 140a and a cathode horn 140b having different pressure surface densities.

Figure 4:
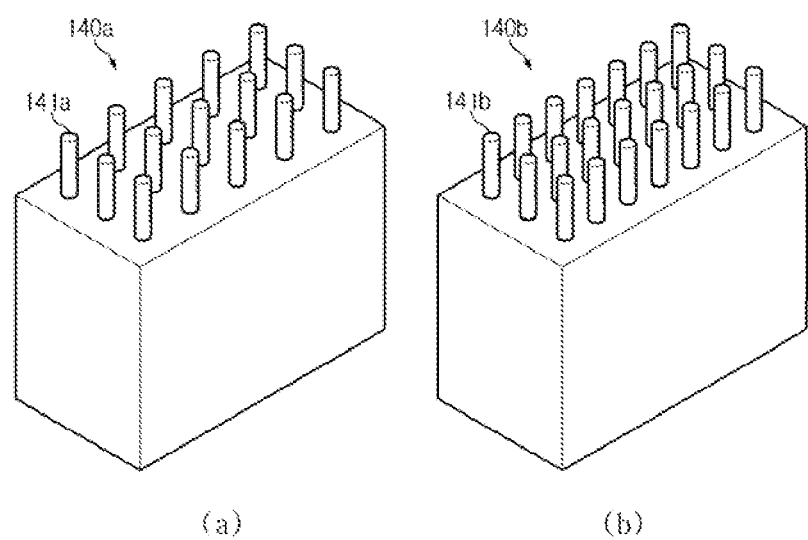
FIG. 4 is a perspective view showing an anode horn and a cathode horn according to the first embodiment of the present disclosure.

FIG. 4 is a perspective view showing an anode horn and a cathode horn according to the first embodiment of the present disclosure.

Referring to FIG. 4, a cathode horn 140a and an anode horn 140b respectively include a plurality of contact members 141a, 141b, which deliver ultrasonic vibrations to the electrode leads 330, 340. The end portions of the contact members 141a, 141b are formed to have a predetermined area, and the areas of the end portions of the contact members 141a, 141b determine pressure surface densities of the anode horn 141a and the cathode horn 141b, respectively. Here, the pressure surface densities of the horns 140a, 140b are densities of the areas in the end portions of the horns 140a, 140b, which transmit ultrasonic waves while pressurizing the electrode leads 330, 340. The pressure surface densities of the horns 140a, 140b indicate the areas of the end portions of the contact members 141a, 141b, included in a unit area of the bottom surfaces of the horns 140a, 140b.

The areas of the end portions of the contact members 141a, 141b, formed at the anode horn 140b and the cathode horn 140a, are the same, but the number of the contact members 141b, formed at the anode horn 140b (hereinafter referred to as an 'anode contact member'), is larger than that of the contact members 141a, formed at the cathode horn 140a (hereinafter referred to as a 'cathode contact member'), and thus, the anode horn 140b has higher pressure surface density than the cathode horn 140a. That is, more contact members 141b are densified and formed at the anode horn 140b rather than at the cathode horn 140a, and thus, the total area of the end portions of the anode contact members 141b becomes larger than that of the end portions of the cathode contact members 141a. Accordingly, the pressure surface density of the anode horn 140b becomes higher than that of the cathode horn 140a. That is, in order to enhance the welding strength of the anode lead 340 and the anode tab 320 to the level of the welding strength of the cathode lead 330 and the cathode tab 310, the anode horn 140b has higher pressure surface density than the cathode horn 140a.

Figure 5:
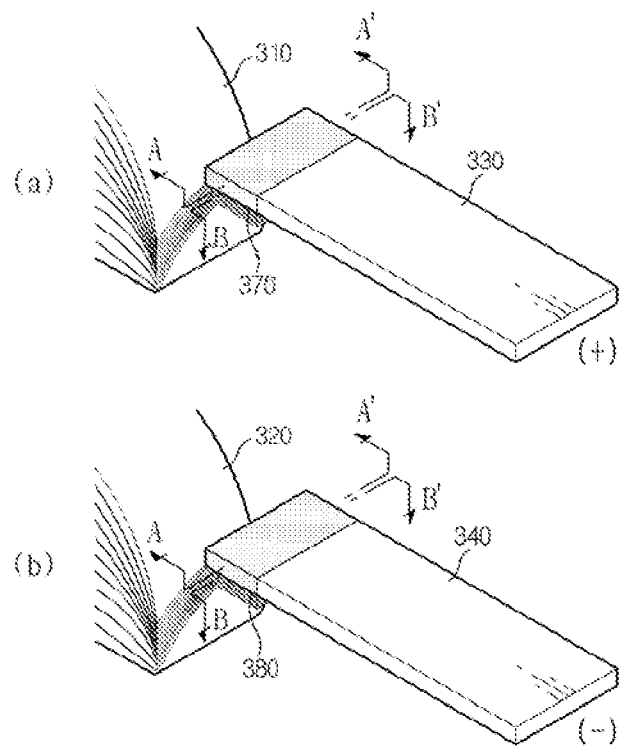
FIG. 5 is a view showing an anode structure and a cathode structure, which are welded with ultrasonic waves, according to an embodiment of the present disclosure.

FIG. 5 is a view showing an anode structure and a cathode structure, which are welded with ultrasonic waves, according to an embodiment of the present disclosure.

Figure 6:
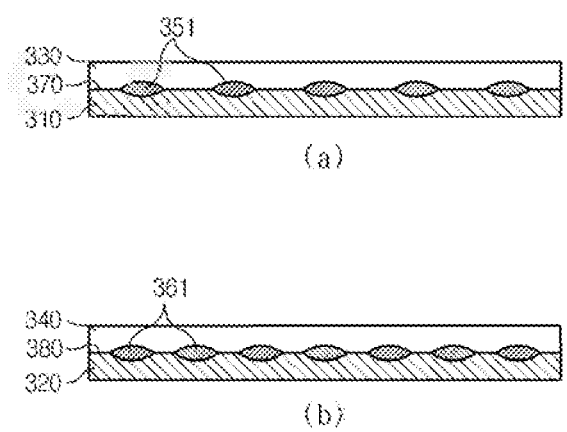
FIG. 6 is a cross-sectional view, taken along the line A-A', showing an electrode structure welded by using a horn according to the first embodiment of the present disclosure.

FIG. 6 is a cross-sectional view, taken along the line A-A', showing an electrode structure welded by using a horn according to the first embodiment of the present disclosure.

Figure 7:
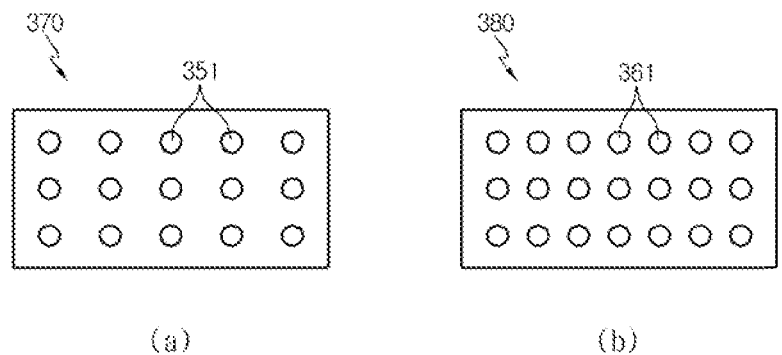
FIG. 7 is a plane cross-sectional view, taken along the line B-B', showing an electrode structure welded by using a horn according to the first embodiment of the present disclosure.

FIG. 7 is a plane cross-sectional view, taken along the line B-B', showing an electrode structure welded by using a horn according to the first embodiment of the present disclosure.

Hereinafter, although a welding point is not in a full circle shape, for the convenience of explanation, the welding point is illustrated with a circle shape in FIGS. 7, 10, 13, 14, 18 and 21.

Referring to FIGS. 5 to 7, a plurality of welding points 351, 361 are respectively formed at the welding surfaces 370, 380, welded with ultrasonic waves by using the horns 140a, 140b according to the first embodiment of the present disclosure. The welding points 351, 361 represent portions melted and coupled through ultrasonic vibrations in the bottom surfaces of the electrode leads 330, 340 and the top surfaces of the entire electrode tabs 310, 320. Also, the welding surfaces 370, 380 represent interfaces between the bottom surfaces of the electrode leads 330, 340 and the top surfaces of the electrode tabs 310, 320 respectively coupled and electrically connected to each other through the welding points 351, 361.

As shown in FIGS. 6 and 7, the densities of the anode welding points 361 and the cathode welding points 351 respectively correspond to the pressure surface densities of the anode horn 140b and the cathode horn 140a. That is, when the anode tab 320 and the anode lead 340 of a secondary battery are welded by using the anode horn 140b having a relatively high pressure surface density, the density of the welding points 361 in the anode welding surface 380 is higher than the density of the welding points 351 in the cathode welding surface 370.

When ultrasonic welding is performed by using the anode horn 140b having a relatively high pressure surface density, the welding strength of the anode welding surface 380 is improved to the level of the welding strength of the cathode welding surface 370. That is, the welding points 351, 361, acting to couple the electrode leads 330, 340 to the electrode tabs 310, 320, are formed more at the anode welding surface 380 during the ultrasonic welding process, and thus, the anode tabs 320 are more strongly coupled and welded to the anode lead 340 than the conventional anode tabs 50 and the anode lead 70. Accordingly, the welding strength of the anode welding surface 380 is improved more than that of an anode welding surface formed in the conventional secondary battery 10, and the anode welding surface 380 attains the level of the welding strength of the cathode welding surface 370. Here, the welding strength indicates the maximum stress that the welding surfaces 370, 380 can endure.

Meanwhile, even though the number of the cathode contact members 141a is the same as the number of the anode contact members 141b, the area of the end portion of each anode contact member 141b may be larger than that of the end portion of each cathode contact member 141a.

Figure 8:
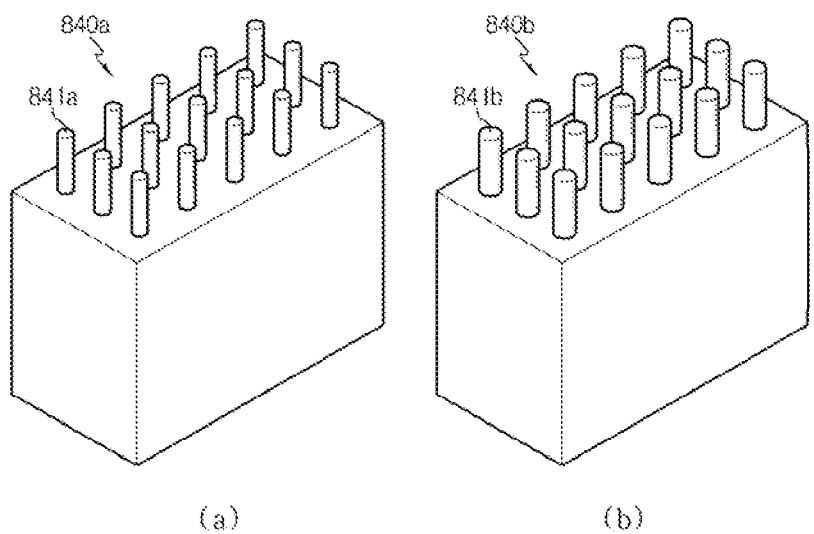
FIG. 8 is a perspective view showing an anode horn and a cathode horn according to the second embodiment of the present disclosure.

FIG. 8 is a perspective view showing an anode horn and a cathode horn according to the second embodiment of the present disclosure.

Figure 9:
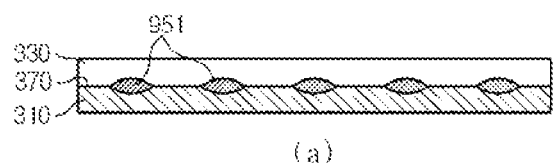
FIG. 9 is a cross-sectional view, taken along the line A-A', showing an electrode structure welded by using a horn according to the second embodiment of the present disclosure.
Figure 9:
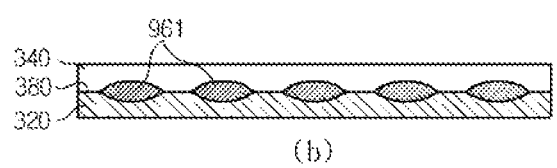

FIG. 9 is a cross-sectional view, taken along the line A-A', showing an electrode structure welded by using a horn according to the second embodiment of the present disclosure.

Figure 10:
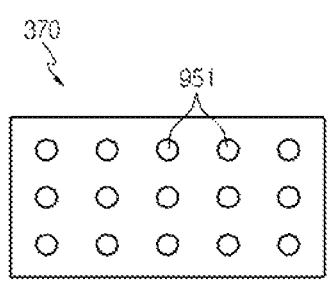
FIG. 10 is a plane cross-sectional view, taken along the line B-B', showing an electrode structure welded by using a horn according to the second embodiment of the present disclosure.
Figure 10:
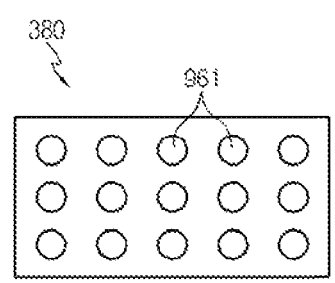

FIG. 10 is a plane cross-sectional view, taken along the line B-B', showing an electrode structure welded by using a horn according to the second embodiment of the present disclosure.

Referring to FIGS. 8 to 10, horns 840a, 840b according to the second embodiment of the present disclosure are respectively provided with different-sized contact members 841a, 841b. That is, the numbers of cathode contact members 841a and anode contact members 841b, respectively formed at the horns 840a, 840b, are the same as each other, but the area of the end portion of the anode contact member 841b is formed larger than that of the end portion of the cathode contact member 841a. In other words, although the number of the anode contact members 841b is the same as the number of the cathode members 841a, the area of the end portion of the anode contact member 841b is larger than that of the end portion of the cathode contact member 841a, so that the pressure surface density of the anode horn 840b becomes much higher than that of the cathode horn 840a.

When an ultrasonic welding process is performed by using the horns 840a, 840b as described above, a welding point 961 (i.e., anode welding point) at the anode welding surface 380 is formed much larger than a welding point 951 (i.e., cathode welding point) formed at the cathode welding surface 370 as shown in FIGS. 9 and 10.

That is, individual welding points 951, 961, which act to couple the electrode leads 330, 340 to the electrode tabs 310, 320, are formed much larger at the anode welding surface 380 during an ultrasonic welding process. Through the welding point 961, the anode tab 320 and the anode lead 340 are more strongly coupled and welded to each other than the conventional anode tabs 50 and the anode lead 70. Accordingly, the welding strength of the anode welding surface 380 is improved much more than that of the anode welding surface formed in the conventional secondary battery 10, and the anode welding surface 380 attains the level of the welding strength of the cathode welding surface 370.

Meanwhile, in order to form the total area of the end portions of the anode contact members 141b, 841b larger than that of the end portions of the cathode contact members 141a 841a, a plurality of anode contact members 141b, 841b may be formed at the anode horns 140b, 840b. That is, although the contact members with different sizes and numbers are formed at the anode horns 140b, 840b and the cathode horns 140a, 840a, the total area of the end portions of the contact members distributed on the anode horns 140b, 840b may be formed much larger than the total area of the end portions of the contact members distributed on the cathode horns 140a, 840a.

When an ultrasonic welding process is performed by using the anode horns as described above, the size and number of the welding points, respectively formed at the anode welding surface 380 and the cathode welding surface 370, are different from each other, but the total area of the welding points in the anode welding surface 380, is formed larger than the total area of the welding points in the cathode welding surface 370. Therefore, the density of the welding points in the anode welding surface 380 becomes larger than the density of the welding points in the cathode welding surface 370.

Meanwhile, a state where a cathode contact member and an anode contact member have the same shape, different welding process factors may be applied to a cathode horn and an anode horn.

Figure 11:
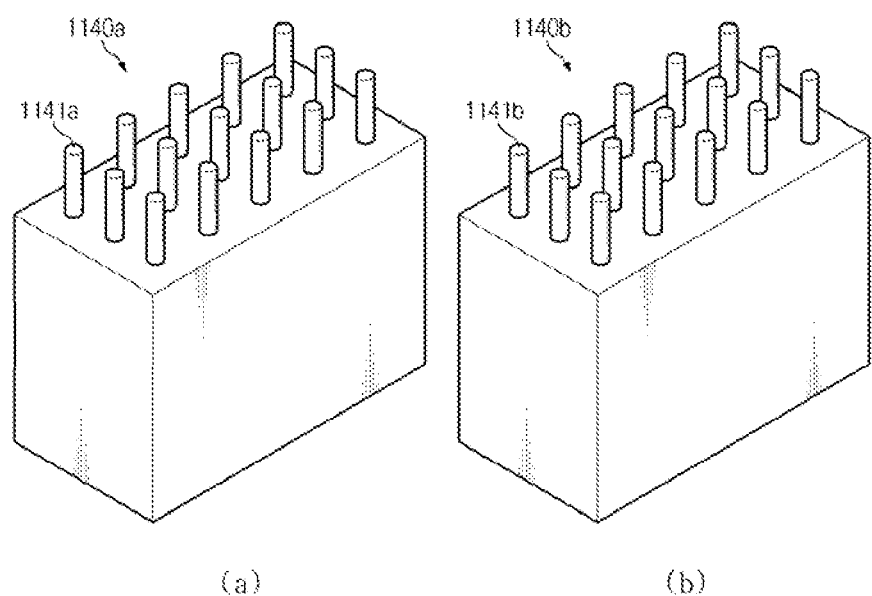
FIG. 11 is a perspective view showing an anode horn and a cathode horn according to the third embodiment of the present disclosure.

FIG. 11 is a perspective view showing an anode horn and a cathode horn according to the third embodiment of the present disclosure.

Figure 12:
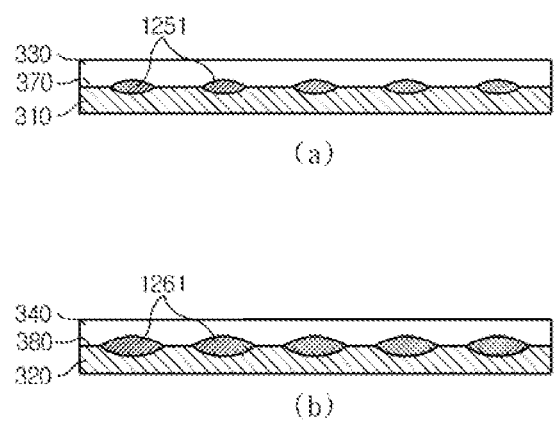
FIG. 12 is a cross-sectional view, taken along the line A-A', showing an electrode structure welded by using a horn according to the third embodiment of the present disclosure.

FIG. 12 is a cross-sectional view, taken along the line A-A', showing an electrode structure welded by using a horn according to the third embodiment of the present disclosure.

Figure 13:
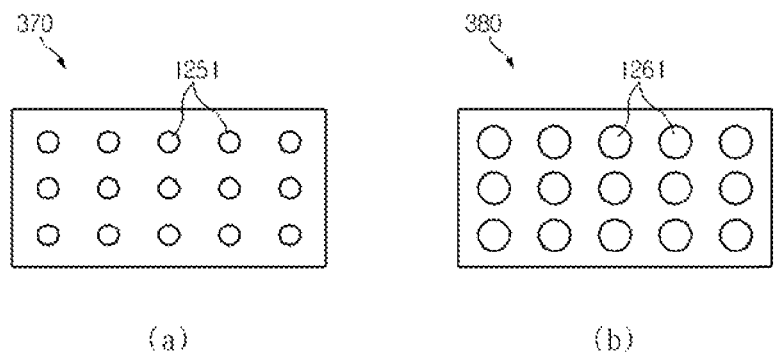
FIG. 13 is a plane cross-sectional view, taken along the line B-B', showing an electrode structure welded by using a horn according to the third embodiment of the present disclosure.

FIG. 13 is a plane cross-sectional view, taken along the line B-B', showing an electrode structure welded by using a horn according to the third embodiment of the present disclosure.

Figure 14:
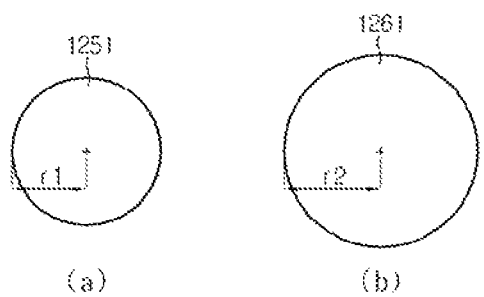
FIG. 14 is a magnified view showing welding points of FIG. 13 according to the third embodiment of the present disclosure.

FIG. 14 is a magnified view showing welding points of FIG. 13 according to the third embodiment of the present disclosure.

Referring to FIGS. 11 to 14, a cathode horn 1140a and an anode horn 1140b according to the third embodiment of the present disclosure respectively include a plurality of contact members 1141a, 1141b which deliver ultrasonic vibrations to the electrode leads 330, 340. As shown in FIG. 11, the contact members 1141a, 1141b are of the same shape and number at the anode horn 1140b and the cathode horn 1140a.

The cathode horn 1140a and the anode horn 1140b adopt different process factors, and the cathode horn 1140a and the anode horn 1140b pressurize the cathode lead 330 and the anode lead 340 based on the process factors and deliver ultrasonic waves at the same time. That is, the anode horn 1140b pressurizes the anode lead 340 with a pressure greater than the pressure used when the cathode horn 1140a pressurizes the cathode lead 330. Otherwise, the anode horn 1140b may deliver more intensive ultrasonic waves to the anode lead 340 than the ultrasonic waves delivered from the cathode horn 1140a to the cathode lead 330. More specifically, the electronic ultrasonic generator 110 provides a high-frequency current greater than a high-frequency current provided to a cathode ultrasonic transducer 120a, to the anode ultrasonic transducer 120b, and the provided high frequency current is convened and amplified to ultrasonic waves through the anode ultrasonic transducer 120b and the booster 130b to deliver to the anode horn 1140b. Accordingly, the anode horn 1140b delivers more intensive ultrasonic waves to the anode lead 340 than the ultrasonic waves transmitted from the cathode horn 1140a.

When the anode horn 1140b delivers ultrasonic waves, which are more intensive than the ultrasonic waves of the cathode horn 1140a, to the electrode lead 240, or when the anode horn 1140b pressurizes the anode lead 340 with a pressure greater than the pressure derived from the cathode horn 1140a, the radius r2 of welding point 1261 at the anode welding surface 380 is formed longer than the radius r1 of welding point 1251 at the cathode welding surface 370. That is, as shown in FIG. 12, the welding point 1261 formed at the anode welding surface 380 has a radius longer than the welding point 1251 formed at the cathode welding surface 370. In other words, the anode horn 140b delivers ultrasonic waves or pressures more intensive than that of the cathode horn 140a, and thus, the radius r2 of the anode welding point 1261 becomes much longer than the radius r1 of the cathode welding point 1251.

Meanwhile, as shown in FIGS. 12 and 13, the area of the cathode welding surface 370 is the same as the area of the anode welding surface 380. That is, the ultrasonic welding is performed by using the anode horn 1140b and the cathode horn 1140a, which are of the same shape and number, and the welding area of the cathode lead 330 and the cathode tabs 310 is formed to be the same as the welding area of the anode lead 340 and the anode tabs 320.

Here, when the ultrasonic welding is performed to increase the radius of the anode welding point 1261, the welding strength of the anode welding surface 380 is improved. That is, according to the ultrasonic welding process of the third embodiment of the present disclosure, the welding surfaces 370, 380 are formed to have the same number of the welding points 1251, 1261 during the ultrasonic welding process, but the radius r2 of the anode welding point 1261 is formed longer than the radius r1 of the cathode welding point 1251. Accordingly, the total area of the anode welding points 1261 becomes larger than that of the cathode welding points 1251, and the density of the welding points in the anode welding surface 380 is higher than that of the welding points in the cathode welding surface 370. Since the densities of the welding points 1251, 1261, acting to couple the electrode leads 330, 340 to the electrode tabs 310, 320, respectively, are formed much higher in the anode welding surface 380, the welding strength of the anode welding surface 380 is improved more than the welding strength of the anode welding surface formed in the conventional secondary battery 10, and the anode welding surface 380 attains the level of the welding strength of the cathode welding surface 370.

If the ultrasonic process is performed according to the aforementioned first, second, or third embodiment of the present disclosure, the welding strength of the anode welding surface 380 constituting a secondary battery is improved to the level of the welding strength of the cathode welding surface 370, thereby preventing the breakage of the anode welding surface 380 caused by external physical impacts. Also, in the secondary battery according to the present disclosure, both electrodes have uniform welding strength, so that uniform contact resistance is formed for both electrodes.

Meanwhile, the welding surfaces 350, 360 of the electrode tabs 310, 320 and the electrode leads 330, 340 of the secondary battery have an extremely weak mechanical strength in a lateral direction. That is, if an impact is applied to the secondary battery, the sides of the welding portion of the electrode tabs 310, 320 and the electrode leads 330, 340 is easily broken rather than the other portions of the welding portion thereof.

Figure 15:
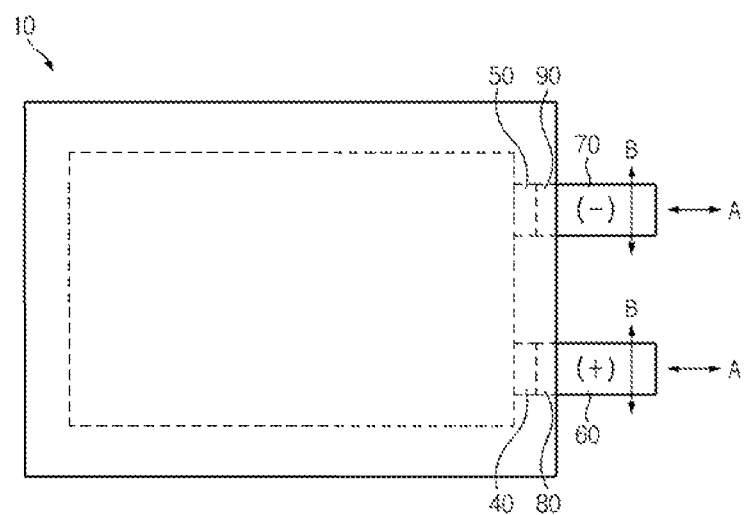
FIG. 15 is a cross-sectional view showing a conventional secondary battery.

FIG. 15 is a cross-sectional view showing a conventional secondary battery. As shown in FIG. 15, if a force is applied to the electrode leads 60, 70 of the secondary battery 10 in a longitudinal direction (A direction) or a lateral direction (B direction), the welding strength of the welding surfaces 80, 90 is high against the force applied in the longitudinal director (A direction), and the welding strength of the welding surfaces 80, 90 is significantly low against the force in the lateral direction (B direction) as compared with the welding strength against the force in the longitudinal direction. That is, if external physical impacts are applied in the lateral direction (B direction), it is more likely to break the welding surfaces of the electrode leads 60, 70 and the electrode tabs 40, 50 included in the conventional secondary battery 10.

Accordingly, in order to more securely protect a secondary battery from external physical impacts, the welding strength of the side portions of the welding surfaces 80, 90 should be enhanced.

Hereinafter, an ultrasonic welding apparatus, which improves the welding strength of the side portions of a welding surface, will be described in detail with reference to FIGS. 16 to 21.

Figure 16:
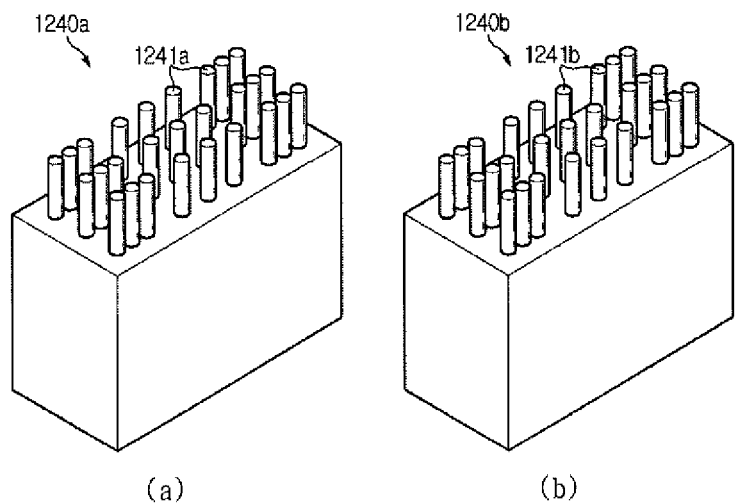
FIG. 16 is a perspective view showing an anode horn and a cathode horn according to the fourth embodiment of the present disclosure.

FIG. 16 is a perspective view showing an anode horn and a cathode horn according to the fourth embodiment of the present disclosure.

Figure 17:
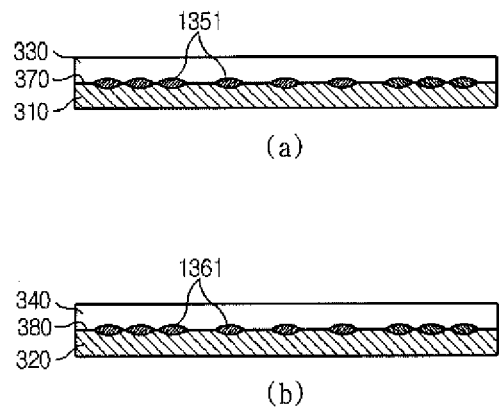
FIG. 17 is a cross-sectional view, taken along the line A-A', showing an electrode structure welded by using a horn according to the fourth embodiment of the present disclosure.

FIG. 17 is a cross-sectional view, taken along the line A-A', showing an electrode structure welded by using a horn according to the fourth embodiment of the present disclosure.

Figure 18:
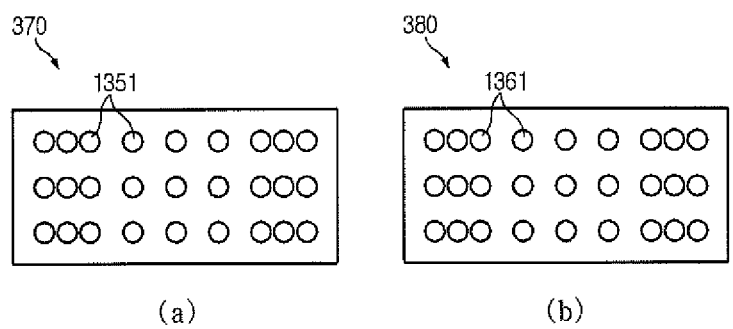
FIG. 18 is a plane cross-sectional view, taken along the line B-B', showing an electrode structure welded by using a horn according to the fourth embodiment of the present disclosure.

FIG. 18 is a plane cross-sectional view, taken along the line B-B', showing an electrode structure welded by using a horn according to the fourth embodiment of the present disclosure.

Referring to FIGS. 16 to 18, horns 1240a, 1240b according to the fourth embodiment of the present disclosure respectively include a plurality of contact members 1241a, 1241b which pressurize the electrode leads 330, 340 and deliver ultrasonic waves, at the same time. The contact members 1241a, 1241b are formed more at both sides of the horns 1240a, 1240b than at the center thereof. That is, in order to improve the welding strength of the side portions of the welding surfaces 370, 380, the contact members 1241a, 1241b of the same size are relatively densified at both sides of the horns 1240a, 1240b rather than at the center thereof. In other words, more numbers of contact members 1241a, 1241b are formed at both sides of the horns 1240a, 1240b rather than at the center thereof. Accordingly, the pressure surface densities of the cathode horn 1240a and the anode horn 1240b are higher at both sides of the horns than at the center thereof.

When an ultrasonic welding process is performed by using the horns 1240a, 1240b described above, the densities of the welding points 1351, 1361 in the welding surfaces 370, 380 are higher at both sides of the welding surfaces 370, 380 than at the center thereof as shown in FIGS. 17 and 18. That is, since ultrasonic welding is performed by using the contact members 1241a, 1241b, which are relatively densified at both sides of the horns 1240a, 1240b rather than at the center thereof, the numbers of the welding points 1351, 1361 in the welding surfaces 370, 380 are larger at both sides of the welding surfaces 370, 380 than the center thereof. Accordingly, the densities of the welding points 1351, 1361 are relatively higher at both sides of the welding surfaces 370, 380 than at the center thereof.

If the densities of the welding points are formed relatively high at both sides of the welding surfaces 370, 380 as described above, the strength of the side portions of the welding surfaces 370, 380 is improved. That is, if the densities of the welding points 1351, 1361 are formed relatively high at both sides of the welding surfaces 370, 380 by using the horns 1240a, 1240b according to the fourth embodiment of the present disclosure, the welding strength of the side portions of the electrode tabs 310, 320 and electrode leads 330, 340, which are coupled to each other by welding, is improved. In other words, the welding points 1351, 1361 which are relatively formed more at both side portions of the welding surfaces 370, 380 than at the center portion thereof, act to more strongly couple both sides of the electrode tabs 310, 320 to the electrode leads 330, 340, thereby improving the strength of the side portions of the welding surfaces 370, 380.

Meanwhile, the numbers of the contact members 1241a, 1241b may gradually increase from the center of the horns 1240a, 1240b to both sides thereof. That is, the predetermined numbers of the contact members 1241a, 1241b may be formed at the center of the horns 1240a, 1240b, and the numbers of the contact members 1241a, 1241b may gradually increase from the center of the horns 1240a, 1240b to both sides thereof. In other words, the contact members 1241a, 1241b of the horns 1240a, 1240b may be gradually densified from the center of the horns 1240a, 1240b to both sides thereof.

When an ultrasonic welding process is performed by using the horns 1240a, 1240b in which the numbers of contact members 1241a, 1241b gradually increase, the numbers of the welding points 1351, 1361 in the welding surfaces 370, 380 gradually increase from the center of the welding surfaces 370, 380 to both sides thereof. Accordingly, the densities of the welding points 1351, 1361 are relatively higher at both sides of the welding surfaces 370, 380 than at the center thereof, thereby improving the welding strength of the side portions of the coupled electrode tabs 310, 320 and electrode leads 330, 340, respectively.

Meanwhile, the contact members 1241a, 1241b may be distributed on the horns 1240a, 1240b at regular intervals, and the area of the end portions of the contact members 1241a, 1241b, distributed on both sides of the horns 1240a, 1240b may be larger than the area of the end portions of the contact members 1241a, 1241b, distributed on the center of the horns 1240, 1240b.

Figure 19:
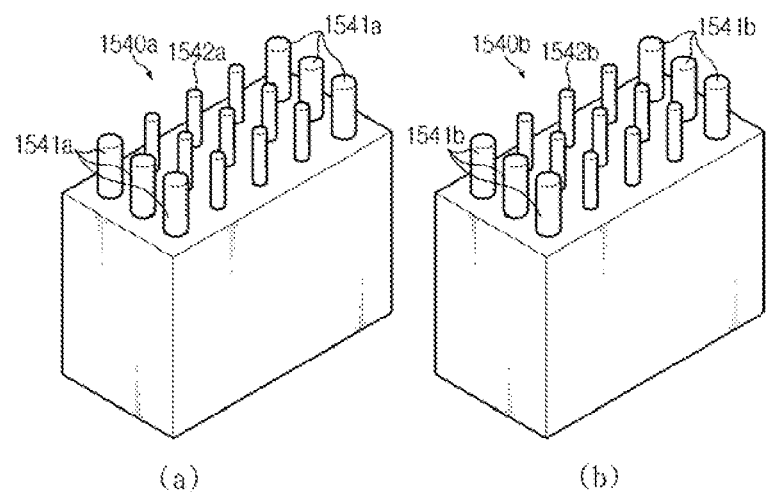
FIG. 19 is a perspective view showing an anode horn and a cathode horn according to the fifth embodiment of the present disclosure.

FIG. 19 is a perspective view showing an anode horn and a cathode horn according to the fifth embodiment of the present disclosure.

Figure 20:
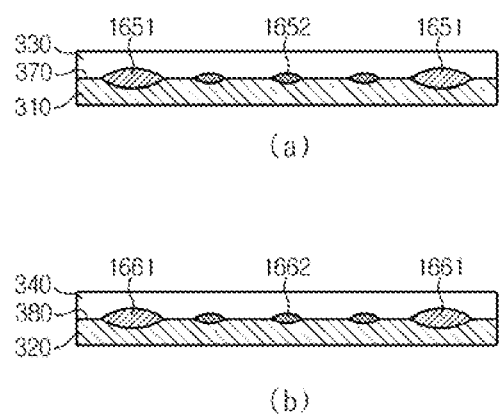
FIG. 20 is a cross-sectional view, taken along the line A-A', showing an electrode structure welded by using a horn according to the fifth embodiment of the present disclosure.

FIG. 20 is a cross-sectional view, taken along the line A-A', showing an electrode structure welded by using a horn according to the fifth embodiment of the present disclosure.

Figure 21:
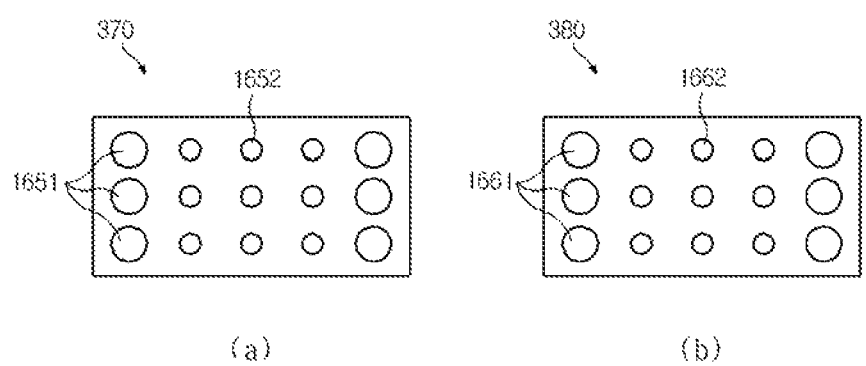
FIG. 21 is a plane cross-sectional view, taken along the line B-B', showing an electrode structure welded by using a horn according to the fifth embodiment of the present disclosure.

FIG. 21 is a plane cross-sectional view, taken along the line B-B', showing an electrode structure welded by using a horn according to the fifth embodiment of the present disclosure.

Referring to FIGS. 19 to 21, contact members 1541a, 1542a, 1541b, 1542b according to the fifth embodiment of the present disclosure are distributed on horns 1540a, 1540b at regular intervals, and the areas of the end portions of the contact members 1541a, 1541b, formed at both sides of the horns, are larger than the areas of the end portions of the contact members 1542a, 1542b, and thus, the pressure surface densities of the horns 1540a, 1540b are relatively higher at both sides of the horns than at the center thereof. That is, although the contact members 1541a, 1542a, 1541b, 1542b are not densified at both sides of the horns 1540a, 1540b but are distributed on the horns 1540a, 1540b at regular intervals, the areas of the end portions of the contact members 1541a, 1541b, formed at both sides, are larger than the areas of the end portions of the contact members 1542a, 1542b, formed at the center. Accordingly, the pressure surface densities of the horns 1540a, 1540b are higher at both sides thereof than at the center thereof.

When ultrasonic welding is performed by using the horns 1540a, 1540b, the densities of the welding points 1651, 1652, 1661, 1662 in the welding surfaces 370, 380 correspond to the contact members 1541a, 1542a, 1541b, 1542b, which are formed at the horns 1540a, 1540b. That is, as shown in FIGS. 20 and 21, the areas of the welding points 1651, 1661, formed at both sides of the welding surfaces 370, 380, are larger than the areas of the welding points 1652, 1662, formed at the center of the welding surfaces 370, 380. Accordingly, the densities of the welding points 1651, 1652, 1661, 1662 in the welding surfaces 370, 380 are relatively higher at both sides of the welding surfaces 370, 380 than at the center thereof.

When an ultrasonic welding process is performed by using the horns 1540a, 1540b according to the fifth embodiment of the present disclosure, the electrode welding surfaces 370, 380 welded with ultrasonic waves have an improved welding strength of the side portions thereof compared to the conventional electrode welding surfaces 80, 90. That is, when much larger welding points 1651, 1661 are formed at both sides of the welding surfaces 370, 380 through the ultrasonic welding process, the welding strength of the side portions of the coupled electrode tabs 310, 320 and electrode leads 330, 340, respectively is improved. In other words, the welding points 1651, 1661, formed relatively larger at both sides of the welding surfaces 370, 380 than at the center thereof, act to more strongly couple both sides of the electrode tabs 310, 320 to the electrode leads 330, 340, thereby improving the welding strength of the side portions of the welding surfaces 370, 380.

Meanwhile, the areas of the end portions of the contact members 1541a, 1542a, 1541b, 1542b may gradually increase from the center of the horns 1540a, 1540b to both sides thereof. That is, the contact members 1541a, 1542a, 1541b, 1542b in which the areas of the end portions gradually increase from the center of the horns 1540a, 1540b to both sides thereof may be formed at the horns 1540a, 1540b. In other words, the area of end portion of each contact member 1541a, 1542a, 1541b, 1542b may gradually increase from the center of the horns 1540a, 1540b to both sides thereof.

When an ultrasonic welding process is performed by using the horns 1540a, 1540b in which the areas of end portions of contact members 1541a, 1542a, 1541b, 1542b gradually increase, the areas of the welding points 1651, 1652, 1661, 1662 in the welding surfaces 370, 380 gradually increase from the center of the welding surfaces 370, 380 to both sides thereof. Therefore, the densities of the welding points 1651, 1652, 1661, 1662 are formed relatively high at both sides of the welding surfaces 370, 380 rather than the center thereof, thereby improving the welding strength of the side portions of the coupled electrode tabs 310, 320 and the electrode leads 330, 340, respectively.

According to the fourth and fifth embodiments of the present disclosure as described above, by using the ultrasonic welding apparatus 100, the welding surfaces 370, 380 have an improved mechanical strength in a lateral direction, to protect a secondary battery from external physical impacts applied in a lateral direction.

Meanwhile, the horns 140a, 140b, 840a, 840b, 1140a, 1140b according to the first, second or third embodiment of the present disclosure and the horns 1240a, 1240b, 1540a, 1540b according to the fourth or fifth embodiment of the present disclosure may be implemented in an integrated pattern.

For example, in order to improve the welding strength of the anode welding surface 380, an anode horn may have a high pressure surface density, and each of the cathode horn and the anode horn may have a relatively high pressure surface density at both sides thereof rather than at the center. That is, the horns 140a, 140b, 840a, 840b, 1140a, 1140b according to the first, second or third embodiment of the present disclosure and the horns 1240a, 1240b, 1540a, 1540b according to the fourth or fifth embodiment of the present disclosure are implemented in an integrated pattern. If an ultrasonic welding process of a secondary battery is performed by using the horns in an integrated pattern, the welding strength of an anode structure of a secondary battery is improved and at the same time, the strength of the side portions of a cathode structure and an anode structure is improved.

In addition, according to the embodiments of the present disclosure, the contact members 141a, 141b, 841a, 841b, 1141a, 1141b, 1241a, 1241b, 1541a, 1541b, 1542a, 1542b are shown in a pin shape, but the present disclosure is not limited thereto. For ultrasonic welding, the contact members 141a, 141b, 841a, 841b, 1141a, 1141b, 1241a, 1241b, 1541a, 1541b, 1542a, 1542b may have various shapes, such as a square pillar shape, a triangular prism shape, a tapered shape, a hemisphere shape, a horn shape, a wedge shape, etc.

INDUSTRIAL APPLICABILITY

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A secondary battery, comprising:
an electrode assembly in which a cathode plate provided with a cathode tab, an anode plate provided with an anode tab, and a separator are stacked in turn;
a pouch for receiving the electrode assembly;
a cathode lead welded and electrically coupled to the cathode tab at a second welding surface; and
an anode lead welded and electrically coupled to the anode tab at a first welding surface,
wherein a first density of welding points, formed at the first welding surface between the anode lead and the anode tab, is higher than a second density of welding points, formed at the second welding surface between the cathode lead and the cathode tab;
wherein each of the first welding surface and the second welding surface includes a central axis and a plurality of the welding points arranged in a plurality of columns extending perpendicular to the central axis, each of the columns being defined by a linear arrangement of a plurality of discrete welding points;
wherein a number of the welding points at the first welding surface gradually increases from the central axis of the first welding surface outwardly to both sides of the first welding surface, and a number of the welding points at the second welding surface gradually increases from the central axis of the second welding surface outwardly to both sides of the second welding surface; and
wherein, for each of the first and second welding surfaces, a first spacing between an outermost one of the columns and a first one of the columns disposed directly adjacent the outermost column is less than a second spacing between a central one of the columns and a second one of the columns disposed directly adjacent the central column, the second column being disposed between the central column and the first column.

2. The secondary battery according to claim 1, wherein the area of an individual welding point of the first density of welding points, formed at the first welding surface between the anode lead and the anode tab, is larger than that of an individual welding point of the second density of welding points, formed at the second welding surface between the cathode lead and the cathode tab.

3. The secondary battery according to claim 1, wherein the total area of the first density of welding points, formed at the first welding surface between the anode lead and the anode tab, is larger than that of the second density of welding points, formed at the second welding surface between the cathode lead and the cathode tab.

4. A secondary battery, comprising:
an electrode assembly in which a cathode plate provided with a cathode tab, an anode plate provided with an anode tab, and a separator are stacked in turn;
a pouch for receiving the electrode assembly;
a cathode lead welded and electrically coupled to the cathode tab at a second welding surface; and
an anode lead welded and electrically coupled to the anode tab at a first welding surface,
wherein a first radius of a welding point in the first welding surface between the anode lead and the anode tab is longer than a second radius of a welding point in the second welding surface between the cathode lead and the cathode tab;
wherein each of the first welding surface and the second welding surface includes a central axis and a plurality of the welding points arranged in a plurality of columns extending perpendicular to the central axis, each of the columns being defined by a linear arrangement of a plurality of discrete welding points;
wherein a number of the welding points at the first welding surface gradually increases from the central axis of the first welding surface outwardly to both sides of the first welding surface, and a number of the welding points at the second welding surface gradually increases from the central axis of the second welding surface outwardly to both sides of the second welding surface; and wherein, for each of the first and second welding surfaces, a first spacing between an outermost one of the columns and a first one of the columns disposed directly adjacent the outermost column is less than a second spacing between a central one of the columns and a second one of the columns disposed directly adjacent the central column, the second column being disposed between the central column and the first column.

5. The secondary battery according to claim 4, wherein a coupling area of the anode lead and the anode tab is the same as a coupling area of the cathode lead and the cathode tab.

6. A secondary battery, comprising:
an electrode assembly in which a cathode plate provided with a cathode tab, an anode plate provided with an anode tab, and a separator are stacked in turn;
a pouch for receiving the electrode assembly;
a cathode lead welded and electrically coupled to the cathode tab at a first welding surface; and
an anode lead welded and electrically coupled to the anode tab at a second welding surface;
wherein each of the first welding surface and the second welding surface includes a central axis and a plurality of the welding points arranged in a plurality of columns extending perpendicular to the central axis, each of the columns being defined by a linear arrangement of a plurality of discrete welding points;
wherein a number of the welding points at the first welding surface gradually increases from the central axis of the first welding surface outwardly to both sides of the first welding surface, and a number of the welding points at the second welding surface gradually increases from the central axis of the second welding surface outwardly to both sides of the second welding surface; and
wherein, for each of the first and second welding surfaces, a first spacing between an outermost one of the columns and a first one of the columns disposed directly adjacent the outermost column is less than a second spacing between a central one of the columns and a second one of the columns disposed directly adjacent the central column, the second column being disposed between the central column and the first column.

* * * * *